United States Patent
Rhee et al.

(10) Patent No.: US 11,380,936 B2
(45) Date of Patent: Jul. 5, 2022

(54) GEL POLYMER ELECTROLYTE FOR LITHIUM-AIR BATTERY CONTAINING ZWITTERION SALT AND LITHIUM-AIR BATTERY COMPRISING SAME

(71) Applicants: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

(72) Inventors: Jun Ki Rhee, Suwon-si (KR); Hyun Sik Woo, Seoul (KR); Dong Won Kim, Yongin-si (KR)

(73) Assignees: HYUNDAI MOTOR COMPANY, Seoul (KR); KIA MOTORS CORPORATION, Seoul (KR); INDUSTRY-UNIV COOPERATION FDN. HANYANG UNIV, Seoul (KR)

( * ) Notice: Subject to any disclaimer, the term of this patent is extended or adjusted under 35 U.S.C. 154(b) by 46 days.

(21) Appl. No.: 17/102,788

(22) Filed: Nov. 24, 2020

(65) Prior Publication Data
US 2021/0184256 A1    Jun. 17, 2021

(30) Foreign Application Priority Data
Dec. 12, 2019  (KR) .......................... 10-2019-0165193

(51) Int. Cl.
*H01M 10/0565* (2010.01)
*H01M 12/08* (2006.01)

(52) U.S. Cl.
CPC ....... *H01M 10/0565* (2013.01); *H01M 12/08* (2013.01); *H01M 2300/008* (2013.01); *H01M 2300/0082* (2013.01)

(58) Field of Classification Search
CPC ............. H01M 10/0565; H01M 12/08; H01M 2300/008; H01M 2300/0082
See application file for complete search history.

(56) References Cited

U.S. PATENT DOCUMENTS

| | | | |
|---|---|---|---|
| 10,290,898 B2 * | 5/2019 | Choi | H01M 10/056 |
| 2012/0129045 A1 * | 5/2012 | Gin | H01M 10/0565 429/189 |
| 2019/0229371 A1 * | 7/2019 | Song | C08L 77/06 |

FOREIGN PATENT DOCUMENTS

KR          101882571 B        7/2018

\* cited by examiner

*Primary Examiner* — Stewart A Fraser
(74) *Attorney, Agent, or Firm* — McDonnell Boehnen Hulbert & Berghoff LLP

(57) ABSTRACT

The present disclosure relates to a gel polymer electrolyte for a lithium-air battery containing a zwitterion salt in a specific amount and to a lithium-air battery including the same and thus having a prolonged battery lifetime, thereby suppressing volatilization of the electrolyte and imparting the lithium-air battery with interfacial stability by inhibiting the formation of dendrites at a lithium anode and suppressing side reactions between the lithium anode and the liquid electrolyte. Moreover, the use of the zwitterion salt can improve the lithium-ion transference number, thereby increasing the lifetime of the battery.

12 Claims, 20 Drawing Sheets

GEL POLYMER ELECTROLYTE FOR LITHIUM-AIR BATTERY CONTAINING ZWITTERION SALT AND LITHIUM-AIR BATTERY COMPRISING SAME

CROSS REFERENCE TO RELATED APPLICATION

The present application claims priority based on Korean Patent Application No. 10-2019-0165193, filed on Dec. 12, 2019, the entire content of which is incorporated herein for all purposes by this reference.

BACKGROUND

1. Technical Field

The present disclosure relates to a gel polymer electrolyte for a lithium-air battery containing a zwitterion salt and a lithium-air battery including the same and thus having a prolonged battery lifetime.

2. Description of the Related Art

A lithium-air battery is a secondary battery composed of a lithium anode, an electrolyte, and an air cathode in which a reversible electrochemical reaction between oxygen and lithium ions may occur. A lithium-air battery theoretically has a high energy density of 11,000 Wh/kg, is inexpensive compared to existing lithium-ion batteries, is environmentally friendly, and is safe, and thus research and development thereon as an energy source for electric vehicles is being actively conducted.

However, in order to commercialize such a lithium-air battery, there remain problems to be solved. When lithium metal is used as an anode, it reacts with an electrolyte or impurities in a battery to thus form a passivation layer. This layer results in local current density differences, ultimately causing non-uniform current distribution during charging and at the same time forming lithium dendrites. Moreover, unlike a conventional secondary battery, since a lithium-air battery operates in an open system, the liquid electrolyte solvent that is used evaporates, thereby greatly increasing the internal resistance of the battery, which shortens the lifetime of the battery.

When an organic liquid electrolyte is applied as an electrolyte for a lithium-air battery, the basic electrochemical properties thereof are excellent, but the liquid electrolyte evaporates during charging and discharging, thereby causing a drastic reduction in battery performance. Moreover, when the organic liquid electrolyte is used, side reactions may occur at the lithium anode due to the high reactivity thereof, and lithium dendrites may be formed during charging and discharging, undesirably lowering charge-discharge efficiency, which ultimately reduces the lifetime of the battery.

With the goal of solving such problems, a method of coating lithium metal with an organic-inorganic hybrid membrane including an inorganic material having high mechanical strength has been proposed, but is disadvantageous because the interfacial resistance with lithium metal is large and the inorganic solid electrolyte may react with lithium metal. Moreover, when a linear polymer is applied on the lithium metal, side reactions with the electrolyte may be suppressed, but the protective layer may be easily detached from the lithium metal and it is difficult to inhibit the formation of lithium dendrites due to the poor mechanical properties thereof.

Therefore, it is necessary to develop an electrolyte that suppresses volatilization of the liquid electrolyte and imparts the lithium-air battery with interfacial stability by inhibiting the formation of dendrites at the lithium anode and suppressing side reactions between the lithium anode and the liquid electrolyte.

SUMMARY

Accordingly, the present disclosure has been made keeping in mind the problems encountered in the related art, and specific objectives thereof are as follows.

An objective of the present disclosure is to provide a gel polymer electrolyte for a lithium-air battery, which includes a zwitterion salt in a specific amount, and a lithium-air battery including the gel polymer electrolyte.

The objectives of the present disclosure are not limited to the foregoing, and will be able to be clearly understood through the following description and to be realized by the means described in the claims and combinations thereof.

An aspect of the present disclosure provides a gel polymer electrolyte for a lithium-air battery, including a composite polymer resin including a linear polymer and a crosslinking agent, an ionic liquid, a lithium salt, a zwitterion salt, an initiator, and an organic solvent.

The gel polymer electrolyte may include 4 to 6 wt % of the composite polymer resin, 7 to 10 wt % of the ionic liquid, 2 to 5 wt % of the lithium salt, 0.15 to 0.40 wt % of the zwitterion salt, 0.02 to 0.04 wt % of the initiator, and 80 to 85 wt % of the organic solvent.

The composite polymer resin may include 85 to 95 wt % of the linear polymer and 5 to 15 wt % of the crosslinking agent.

The linear polymer may be at least one copolymer or mixture selected from the group consisting of polymethyl methacrylate, polystyrene, polyethylene oxide, polytetrafluoroethylene, Nafion and polyurethane.

The crosslinking agent may include at least one selected from the group consisting of divinylbenzene (DVB), triethylene glycol diacrylate (TEGDA) and polyethylene glycol diacrylate (PEGDA).

The ionic liquid may include a salt including at least one cation selected from the group consisting of imidazolium, pyrrolidinium, piperidinium, ammonium, phosphonium, sulfonium, pyridinium, pyrazolium, triazolium, thiazolium, oxazolium, pyridazinium, pyrimidinium and pyrazinium, and at least one anion selected from the group consisting of acetate, bis(fluorosulfonyl)imide, bis(fluoromethanesulfonyl)imide, bromide, chloride, iodide, dicyanamide, hexafluorophosphate, tetrafluoroborate and hydrogen sulfate.

The lithium salt may include at least one selected from the group consisting of LiTFSI, LiFSI, $LiBF_4$, $LiPF_6$, $LiClO_4$, $LiAsF_6$, LiDFOB and LiBOB.

The zwitterion salt may include at least one cation selected from the group consisting of imidazolium, pyrrolidinium, piperidinium and ammonium and at least one anion selected from the group consisting of sulfonate, carboxylate and phosphite.

The initiator may include at least one selected from the group consisting of 2,2'-azobis(2-methylpropionitrile) (AIBN), benzoyl peroxide and lauroyl peroxide.

The organic solvent may include at least one selected from the group consisting of tetrahydrofuran (THF), acetonitrile (ACN) and dimethyl carbonate (DMC).

Another aspect of the present disclosure provides a lithium-air battery, including an anode including lithium, a cathode using oxygen as a cathode active material, the above gel polymer electrolyte disposed between the anode and the cathode, and a separation membrane positioned on the gel polymer electrolyte.

The separation membrane may include at least one selected from the group consisting of olefin resin, glass fiber, fluorine resin, ester resin and cellulose nonwoven fabric.

According to the present disclosure, there are provided a gel polymer electrolyte for a lithium-air battery, which includes a zwitterion salt in a specific amount, and a lithium-air battery including the gel polymer electrolyte. Since the lithium-air battery according to the present disclosure includes the gel polymer electrolyte for a lithium-air battery, volatilization of the electrolyte can be suppressed, and moreover, the lithium-air battery can be imparted with interfacial stability by inhibiting the formation of dendrites at the lithium anode and suppressing side reactions between the lithium anode and the liquid electrolyte. Furthermore, the zwitterion salt may be contained therein, thus improving the lithium-ion transference number, thereby increasing the lifetime of the battery.

The effects of the present disclosure are not limited to the foregoing, and should be understood to include all effects that can be reasonably anticipated from the following description.

BRIEF DESCRIPTION OF DRAWINGS

FIGS. 6A and 6B are linear sweep voltammetry curve graphs of the gel polymer electrolyte manufactured in Example 1-1 according to the present disclosure and the ionic liquid electrolyte contained in Comparative Example 1, in which FIG. 6A is a graph showing the values on the x-axis ranging from 3.0 to 6.0 and FIG. 6B is a graph showing the values on the x-axis ranging from 0.0 to 1.5;

DETAILED DESCRIPTION

Figure 1:
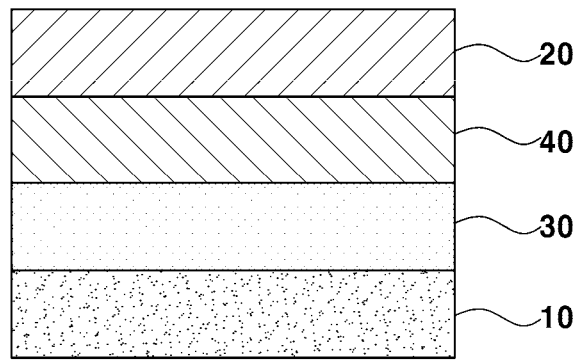
FIG. 1 is a schematic cross-sectional view showing a lithium-air battery according to an embodiment of the present disclosure.

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

It will be understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Gel Polymer Electrolyte for Lithium-Air Battery

According to an embodiment of the present disclosure, a gel polymer electrolyte for a lithium-air battery may include a composite polymer resin including a linear polymer and a crosslinking agent, an ionic liquid, a lithium salt, a zwitterion salt, an initiator, and an organic solvent.

The gel polymer electrolyte for a lithium-air battery according to the present disclosure may include 4 to 6 wt % of the composite polymer resin, 7 to 10 wt % of the ionic liquid, 2 to 5 wt % of the lithium salt, 0.15 to 0.40 wt % of the zwitterion salt, 0.02 to 0.04 wt % of the initiator, and 80 to 85 wt % of the organic solvent.

In a preferred embodiment of the present disclosure, the gel polymer electrolyte for a lithium-air battery is in a gel form having a three-dimensional network structure including a zwitterion salt, with an ionic conductivity of $3.5 \times 10^{-4}$ to $5.9 \times 10^{-4}$ S/cm. The three-dimensional network structure including the zwitterion salt may suppress the volatilization of the liquid electrolyte from the lithium-air battery and may inhibit the dendrite growth at the lithium anode and side reactions with the electrolyte.

The amount of each component of the gel polymer electrolyte for a lithium-air battery according to the present disclosure, which will be described below, is represented based on 100 wt % of the gel polymer electrolyte. If the amount basis thereof is changed, the new basis will always be set forth, so that a person skilled in the art will clearly know the basis on which the amount is described.

(1) Composite Polymer Resin

In an embodiment of the present disclosure, the composite polymer resin is not particularly limited, so long as it includes a polymer that is able to crosslink with the crosslinking agent included therein and thus is a base resin for a gel polymer electrolyte for a lithium-air battery.

The polymer according to the present disclosure may include a typical polymer usable in the present disclosure, for example, a linear polymer, a branched polymer, etc. Although not limited to a specific polymer, preferably useful is a linear polymer, which is stable to a discharge product such as $Li_2O_2$, has high wettability and compatibility with the electrolyte, and is able to efficiently form a three-dimensional network structure.

The linear polymer according to the present disclosure may be a typical linear polymer usable in the present disclosure, for example, at least one copolymer or mixture selected from the group consisting of polymethyl methacrylate, polystyrene, polyethylene oxide, polytetrafluoroethylene, Nafion and polyurethane. Although not limited to a specific linear polymer, preferably useful is methyl methacrylate, which is inexpensive and stable to superoxide anion radicals generated during discharge, has high compatibility with the ionic liquid due to the polymer polar group, and dissociates the lithium salt, thus potentially being helpful in improving ionic conductivity.

The linear polymer according to the present disclosure may have a weight average molecular weight (Mw) ranging from 20,000 to 1,000,000 g/mol. If the weight average molecular weight (Mw) thereof is less than 20,000 g/mol, desired properties cannot be attained. On the other hand, if the weight average molecular weight (Mw) thereof exceeds 1,000,000 g/mol, high ionic conductivity cannot be obtained. Preferably, the weight average molecular weight (Mw) thereof falls in the range of 100,000 to 500,000 g/mol, and more preferably 340,000 to 360,000 g/mol.

The amount of the linear polymer according to the present disclosure is 85 to 95 wt % based on a total of 100 wt % of the composite polymer resin. If the amount of the linear polymer is less than 85 wt %, desired properties cannot be attained and ionic conductivity may decrease due to an increase in the crosslinking density. On the other hand, if the amount thereof exceeds 95 wt %, high ionic conductivity cannot be obtained and desired mechanical properties cannot be attained due to the low crosslinking density.

The crosslinking agent according to the present disclosure may include a typical crosslinking agent usable in the present disclosure, for example, at least one selected from the group consisting of divinylbenzene (DVB), triethylene glycol diacrylate (TEGDA) and polyethylene glycol diacrylate (PEGDA), having a polymerizable vinyl group. Although not limited to a specific crosslinking agent, preferably useful is divinylbenzene (DVB), in which the mechanical properties of polystyrene, having a crosslinked structure obtained through the crosslinking reaction, are superior, and which has high chemical resistance and electrochemical stability.

The amount of the crosslinking agent according to the present disclosure may be 5 to 15 wt % based on a total of 100 wt % of the composite polymer resin. If the amount of the crosslinking agent is less than 5 wt %, a crosslinking reaction may not sufficiently occur, making it difficult to form a three-dimensional network structure, and thus it may be impossible to obtain desired mechanical properties. On the other hand, if the amount of the crosslinking agent exceeds 15 wt %, the ion transference number may decrease due to the increased crosslinking density, undesirably lowering ionic conductivity.

The amount of the composite polymer resin including the linear polymer and the crosslinking agent may be 4 to 6 wt % based on a total of 100 wt % of the gel polymer electrolyte. If the amount of the composite polymer resin is less than 4 wt %, the volume thereof in the polymer solution is small, so the pores in the separation membrane cannot be sufficiently filled after volatilization of the organic solvent. On the other hand, if the amount thereof exceeds 6 wt %, a thick coating with the polymer electrolyte may result, undesirably increasing cell resistance.

(2) Zwitterion Salt

The zwitterion salt according to an embodiment of the present disclosure is not particularly limited, so long as it includes both an anion functional group and a cation functional group.

The zwitterion salt according to the present disclosure may include a typical zwitterion salt usable in the present disclosure, for example, a zwitterion salt that promotes the dissociation of ions in the gel polymer electrolyte for a lithium-air battery or in the polymer functional group and that includes at least one cation selected from the group consisting of imidazolium, pyrrolidinium, piperidinium and ammonium and at least one anion selected from the group consisting of sulfonate, carboxylate and phosphite. Although not limited to a zwitterion salt having a specific combination, preferably useful is N-methyl-N-(propane sulfonate) pyrrolidinium (MPSP), which promotes ion dissociation to thus increase ionic conductivity and is able to improve interfacial properties between the lithium anode and the electrolyte.

The amount of the zwitterion salt may be 0.15 to 0.40 wt % based on a total of 100 wt % of the gel polymer electrolyte. If the amount of the zwitterion salt is less than 0.15 wt %, interfacial properties between the lithium anode and the electrolyte cannot be improved. On the other hand, if the amount thereof exceeds 0.40 wt %, increasing the viscosity in the electrolyte due to an increase in the number of molecules may lower the ionic conductivity, which may lead to deteriorated performance due to an increase in overvoltage.

The gel polymer electrolyte for a lithium-air battery according to the present disclosure may include 0.15 to 0.40 wt % of the zwitterion salt, thus suppressing the volatilization of the electrolyte and imparting the lithium-air battery with interfacial stability by inhibiting the formation of dendrites at the lithium anode and suppressing side reactions between the lithium anode and the liquid electrolyte. Moreover, the zwitterion salt may be included to thus improve the lithium-ion transference number, thereby increasing the lifetime of the battery.

(3) Ionic Liquid and Lithium Salt

The ionic liquid according to an embodiment of the present disclosure is not particularly limited, so long as it includes an ionic salt formed through ionic bonding of an organic cation and an organic or inorganic anion.

The lithium salt according to the present disclosure is not particularly limited, so long as it is mixed with the ionic liquid and may thus function as a plasticizer to impart flexibility to the polymer.

The ionic liquid according to the present disclosure may include a typical ionic liquid usable in the present disclosure, for example, an ionic salt composed of at least one cation selected from the group consisting of imidazolium, pyrrolidinium, piperidinium, ammonium, phosphonium, sulfonium, pyridinium, pyrazolium, triazolium, thiazolium, oxazolium, pyridazinium, pyrimidinium and pyrazinium, and at least one anion selected from the group consisting of acetate, bis(fluorosulfonyl)imide, bis(fluoromethanesulfonyl)imide, bromide, chloride, iodide, dicyanamide, hexafluorophosphate, tetrafluoroborate and hydrogen sulfate. Although not limited to a specific ionic salt, preferably useful is 1-ethyl-3-methylimidazolium (EMIm-TFSI), which imparts flexibility to the polymer through interaction with the lithium salt and traps the electrolyte in the crosslinked network structure through a crosslinking reaction to thus help increase ionic conductivity.

The lithium salt according to the present disclosure may include a typical lithium salt usable in the present disclosure, for example, at least one selected from the group consisting of LiTFSI, LiFSI, $LiBF_4$, $LiPF_6$, $LiClO_4$, $LiAsF_6$, LiDFOB and LiBOB. Although not limited to a specific lithium salt, preferably useful is LiTFSI, which imparts flexibility to the polymer through interaction with the ionic liquid and traps the electrolyte in the crosslinked network structure through a crosslinking reaction to thus help increase ionic conductivity.

The amount of the ionic liquid may be 7 to 10 wt % based on a total of 100 wt % of the gel polymer electrolyte. If the amount of the ionic liquid is less than 7 wt %, the ionic conductivity of the gel polymer electrolyte may decrease. On the other hand, if the amount thereof exceeds 10 wt %, the mechanical properties of the polymer electrolyte may deteriorate due to the plasticizing effect.

Also, the amount of the lithium salt may be 2 to 5 wt % based on a total of 100 wt % of the gel polymer electrolyte. If the amount of the lithium salt is less than 2 wt %, the battery reaction is not efficiently carried out due to the insufficient concentration of lithium ions in the electrolyte. On the other hand, if the amount thereof exceeds 5 wt %, the ionic conductivity may decrease due to the increased viscosity.

(4) Initiator

The initiator according to an embodiment of the present disclosure is not particularly limited, so long as it is able to initiate a polymerization chain reaction.

The initiator according to the present disclosure may include a typical initiator usable in the present disclosure, for example, at least one selected from the group consisting of 2,2'-azobis(2-methylpropionitrile) (AIBN), benzoyl peroxide and lauroyl peroxide. Although not limited to a specific initiator, preferably useful is AIBN, which is able to efficiently initiate a polymerization chain reaction.

The amount of the initiator may be 0.02 to 0.04 wt % based on a total of 100 wt % of the gel polymer electrolyte. If the amount of the initiator is less than 0.02 wt %, the reaction rate is low and unreacted materials may be left behind. On the other hand, if the amount thereof exceeds 0.04 wt %, the remaining initiator may participate in side reactions.

(5) Organic Solvent

The organic solvent according to an embodiment of the present disclosure is not particularly limited, so long as it creates an environment in which a polymerization reaction may occur and does not react with other components.

The organic solvent according to the present disclosure may include a typical organic solvent usable in the present disclosure, for example, at least one selected from the group consisting of tetrahydrofuran (THF), acetonitrile (ACN) and dimethyl carbonate (DMC). Although not limited to a specific organic solvent, preferably useful is THE, which dissolves the constituents well, has low reactivity with lithium metal, and has high volatility and a low boiling point, and may thus be easily dried.

The amount of the organic solvent may be 80 to 85 wt % based on a total of 100 wt % of the gel polymer electrolyte. If the amount of the organic solvent is less than 80 wt %, the separation membrane may be thickly formed due to the high viscosity of the polymer solution, resulting in low ionic conductivity. On the other hand, if the amount thereof exceeds 85 wt %, the relative amount of the composite polymer resin is low, making it difficult to uniformly fill the pores in the separation membrane after drying of the organic solvent.

Lithium-Air Battery

FIG. 1 is a schematic cross-sectional view showing a lithium-air battery 1 according to the present disclosure. With reference thereto, the lithium-air battery 1 includes an anode 10, a cathode 20, a gel polymer electrolyte 30 for a lithium-air battery disposed between the anode and the cathode and a separation membrane 40 positioned on the gel polymer electrolyte.

The anode 10 and the cathode 20 according to the present disclosure may be a typically known anode and cathode usable in the present disclosure. Although not limited to a specific anode or cathode, the anode preferably includes lithium, and the cathode may use oxygen as a cathode active material.

The gel polymer electrolyte 30 according to the present disclosure may be disposed between the anode and the cathode, and is preferably formed on the anode. The gel polymer electrolyte for a lithium-air battery according to the present disclosure may be the same as or different from the above description. Specifically, the gel polymer electrolyte according to the present disclosure may be firmly attached to the surface of the anode due to the three-dimensional network structure including the zwitterion salt, and moreover, the liquid electrolyte is fixed well in the polymer matrix to thus prevent volatilization of the organic solvent and effectively inhibit the formation of lithium dendrites during charging and discharging. Moreover, side reactions between the anode and the electrolyte may be suppressed.

The separation membrane 40 according to the present disclosure may be formed on the gel polymer electrolyte and on the cathode. The separation membrane may be a typically known separation membrane usable in the present disclosure, for example, at least one selected from the group consisting of olefin resin (polyethylene, polypropylene, etc.), glass fiber, fluorine resin (polyvinylidene fluoride, polytetrafluoroethylene, etc.), ester resin (polyethylene terephthalate, etc.) and cellulose nonwoven fabric. Although not limited to a specific component, preferably useful is a polyethylene separation membrane, which exhibits superior chemical resistance and mechanical properties and has low resistance because it is made thin.

The lithium-air battery is configured such that the organic-inorganic hybrid gel polymer electrolyte layer is formed on the anode and the separation membrane is stacked thereon, thus forming a double-layer structure, whereby the chemically crosslinked gel polymer electrolyte may prevent volatilization of the liquid electrolyte and may suppress the growth of lithium dendrites and side reactions. Consequently, the lifetime of the lithium-air battery may be greatly increased by virtue of the above structural advantages.

A better understanding of the present disclosure will be given through the following examples, which are merely set forth to illustrate the present disclosure but are not to be construed as limiting the scope of the present disclosure.

Example 1-1: Manufacture of Gel Polymer Electrolyte for Lithium-Air Battery

A gel polymer electrolyte was manufactured under the following conditions. Specifically, in order to manufacture a composite polymer resin, 0.18 g of a 0.2 M PMMA polymer (average molecular weight: 350,000) as a linear polymer and 0.02 g of DVB as a crosslinking agent were prepared. Also, 0.01 g of N-methyl-N-(propane sulfonate)pyrrolidinium (MPSP) as a zwitterion salt including both an anion functional group and a cation functional group was prepared, and the above components were dispersed in 3 g of an organic solvent THF. Next, 0.133 g of LiTFSI as a lithium salt, 0.33 g of 1-ethyl-3-methylimidazolium (EMIm-TFSI) as an ionic liquid, and 0.001 g of AIBN as an initiator were mixed. Next, a PE separation membrane was placed on a release sheet, and 100 µl of the mixed solution was dropped thereon and was thus uniformly distributed only on the separation membrane due to the surface tension between the solution and the release sheet, followed by thermal crosslinking in a vacuum oven at 70° C. for 12 hr. In order to minimize the effects of active gas in the water and in the atmosphere, all preparation procedures were carried out in a glove box filled with inert argon gas.

Example 1-2: Manufacture of Lithium-Air Battery Including Gel Polymer Electrolyte A lithium-air battery was manufactured using the gel polymer electrolyte manufactured in Example 1-1, lithium metal as an anode, an air electrode using air, namely oxygen as a cathode active material as a cathode, and a polyethylene separation membrane. Here, in order to wet the cathode, 0.5 M LiTFSI dissolved in 1-ethyl-3-methylimidazolium bis(trifluoromethanesulfonyl)imide (EMIm-TFSI) as an ionic liquid was used, and the amount thereof was 30 µl. As the cathode, the air electrode was manufactured by uniformly applying conductive carbon and polytetrafluoroethylene (PTFE) as a binder on a gas diffusion layer (GDL).

Comparative Example 1: Manufacture of Lithium-Air Battery Containing Ionic Liquid Electrolyte A lithium-air battery was manufactured in the same manner as in Example 1-2, with the exception that a polyethylene separation membrane (thickness: 9 µm) was impregnated with 40 µl of an ionic liquid electrolyte prepared by dissolving 0.5 M LiTFSI in 1-ethyl-3-methylimidazolium bis(trifluoromethanesulfonyl)imide (EMIm-TFSI) as an ionic liquid, in lieu of the gel polymer electrolyte manufactured in Example 1-1.

Comparative Example 2-1: Manufacture of Gel Polymer Electrolyte for Lithium-Air Battery Containing No Zwitterion Salt A gel polymer electrolyte for a lithium-air battery was manufactured in the same manner as in Example 1-1, with the exception that the zwitterion salt was not included.

Comparative Example 2-2: Manufacture of Lithium-Air Battery Including Gel Polymer Electrolyte Containing No Zwitterion Salt A lithium-air battery was manufactured in the same manner as in Example 1-2, with the exception that the gel polymer electrolyte manufactured in Comparative Example 2-1 was used.

Comparative Example 3-1: Manufacture of Gel Polymer Electrolyte for Lithium-Air Battery Using Zwitterion Salt in Different Amount A gel polymer electrolyte for a lithium-air battery was manufactured in the same manner as in Example 1-1, with the exception that 0.005 g of a 0.1 M zwitterion salt was used.

Comparative Example 3-2: Manufacture of Lithium-Air Battery Including Gel Polymer Electrolyte Using Zwitterion Salt in Different Amount A lithium-air battery was manufactured in the same manner as in Example 1-2, with the exception that the gel polymer electrolyte manufactured in Comparative Example 3-1 was used.

Comparative Example 4-1: Manufacture of Gel Polymer Electrolyte for Lithium-Air Battery Using Zwitterion Salt in Different Amount A gel polymer electrolyte for a lithium-air battery was manufactured in the same manner as in Example 1-1, with the exception that 0.015 g of a 0.3 M zwitterion salt was used.

Comparative Example 4-2: Manufacture of Lithium-Air Battery Including Gel Polymer Electrolyte Using Zwitterion Salt in Different Amount A lithium-air battery was manufactured in the same manner as in Example 1-2, with the exception that the gel polymer electrolyte manufactured in Comparative Example 4-1 was used.

Test Example 1: Distribution of Gel Polymer Electrolyte for Lithium-Air Battery and Evaluation of Whether Reactive Vinyl Group Remained The gel polymer electrolyte of Example 1-1 was imaged and evaluated to determine whether the vinyl group remained.

Figure 2A:
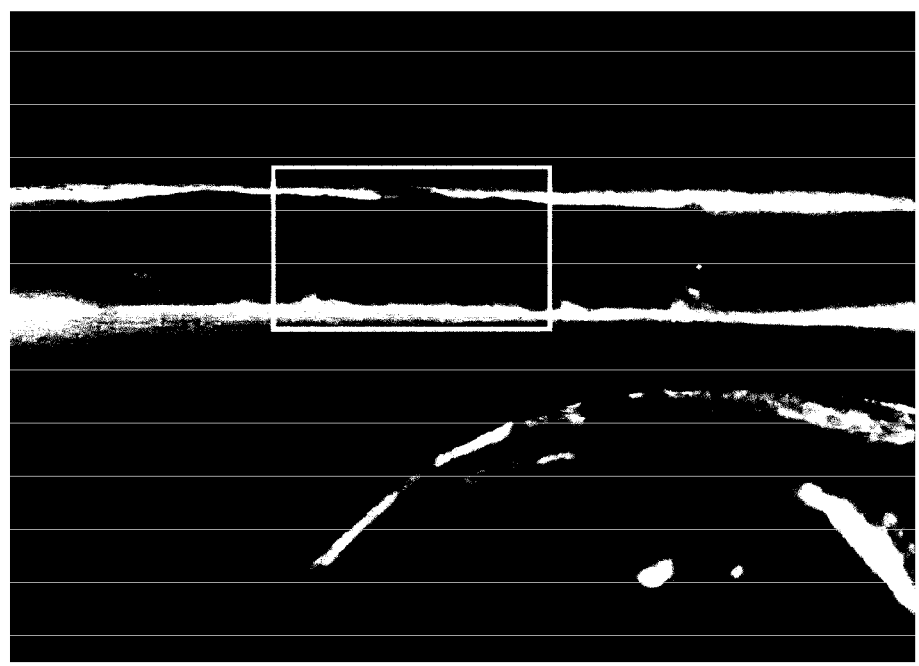
FIG. 2A is a scanning electron microscope image showing the fracture surface of the gel polymer electrolyte for a lithium-air battery manufactured in Example 1-1 according to the present disclosure.
Figure 2B:
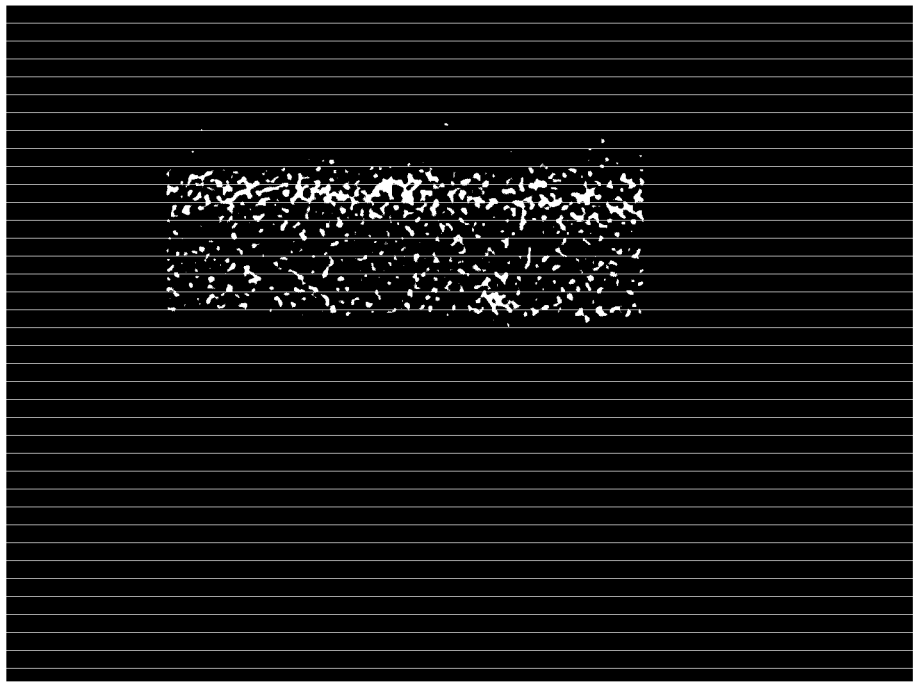
FIG. 2B shows an EDX elemental analysis image of F (fluorine)
Figure 2C:
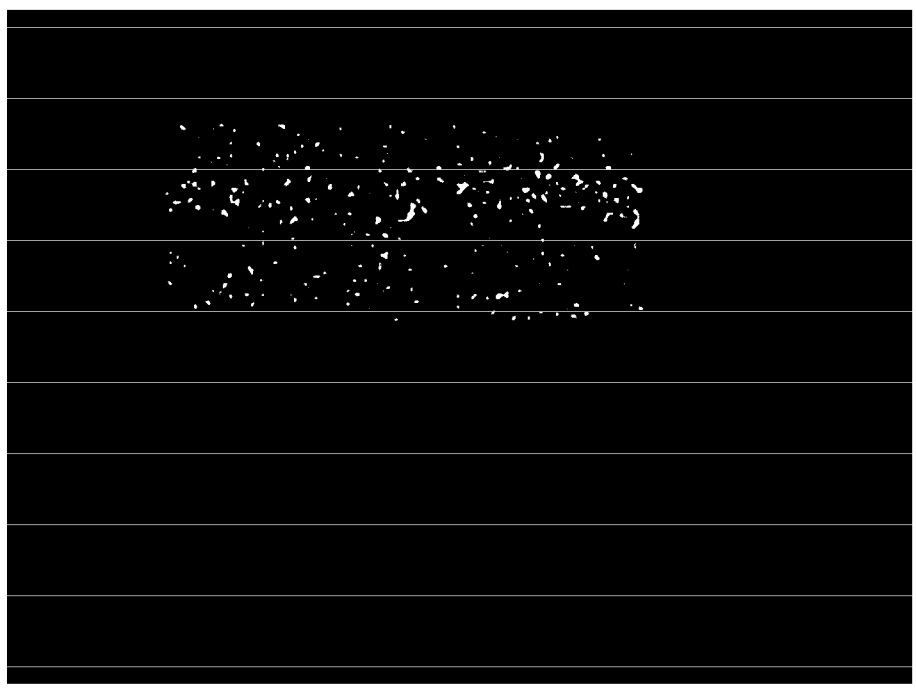
FIG. 2C shows an EDX elemental analysis image of N (nitrogen)
Figure 3:
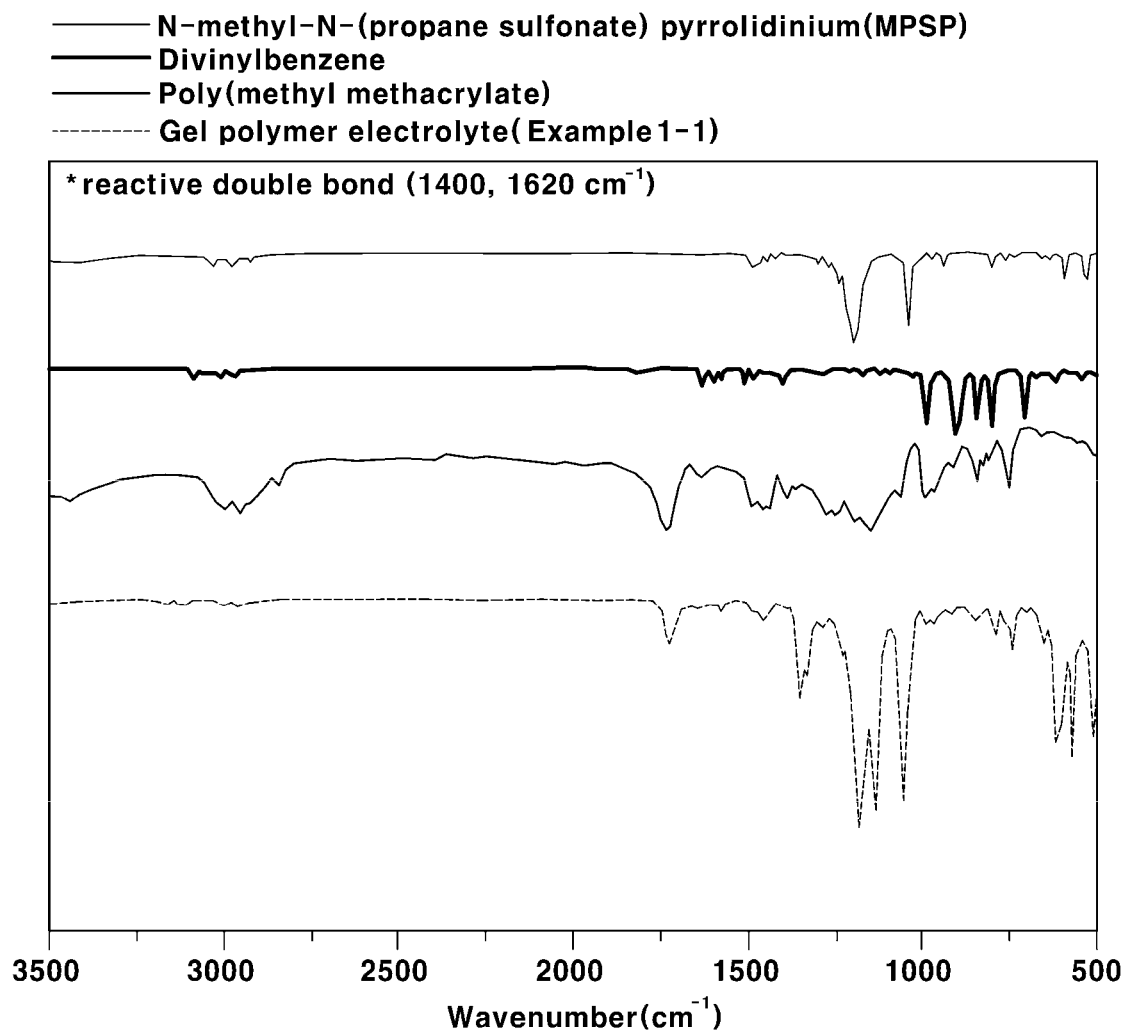
FIG. 3 shows an FT-IR spectrum graph of the gel polymer electrolyte manufactured in Example 1-1 according to the present disclosure.

With reference to FIGS. 2A to 2C, the chemically cross-linked gel polymer electrolyte was uniformly distributed on the separation membrane. With reference to FIG. 3, based on the FT-IR spectrum results, the double-bond peak of the crosslinking agent was not observed near 1400 and 1620 cm$^{-1}$ after crosslinking, indicating that the crosslinking reaction was carried out without unreacted materials.

Test Example 2: Evaluation of Ionic Conductivity and Lithium-Ion Transference Number of Lithium-Air Battery Containing Gel Polymer Electrolyte The ionic conductivity (S/m) and the lithium-ion transference number ($t_{Li+}$) of Example 1-2, Comparative Example 1, Comparative Example 2-2, Comparative Example 3-2, and Comparative Example 4-2 are shown in Table 1 below and in FIG. 4.

TABLE 1

| | Ionic conductivity (S/cm) | Lithium-ion transference number ($t_{Li+}$) |
| --- | --- | --- |
| Comparative Example 1 | 3.2 × 10$^{-3}$ | 0.21 |
| Comparative Example 2-2 | 3.1 × 10$^{-4}$ | 0.30 |
| Comparative Example 3-2 | 5.9 × 10$^{-4}$ | 0.31 |
| Example 1-2 | 4.9 × 10$^{-4}$ | 0.34 |
| Comparative Example 4-2 | 3.5 × 10$^{-4}$ | 0.35 |

* Ionic conductivity: The polymer electrolyte manufactured in the above Example was positioned between two SUS blocking electrodes to manufacture a coin cell, the ionic conductivity of which was calculated using
$$\sigma = \frac{l}{R \times A},$$
in which R is the resistance value measured using an AC impedance process and l and A are the thickness and area of the polymer electrolyte, respectively.
* Lithium-ion transference number: The lithium-ion transference number was calculated using $t_{Li+} = I_S(\Delta V - I_0 R_0)/I_0(\Delta V - I_S R_S)$, in which $I_0$ and $R_0$ are the initial DC current and interfacial resistance values in FIG. 5A, respectively, and $I_S$ and $R_S$ are, respectively, the DC current and interfacial resistance values when reaching the steady state.

Figure 4:
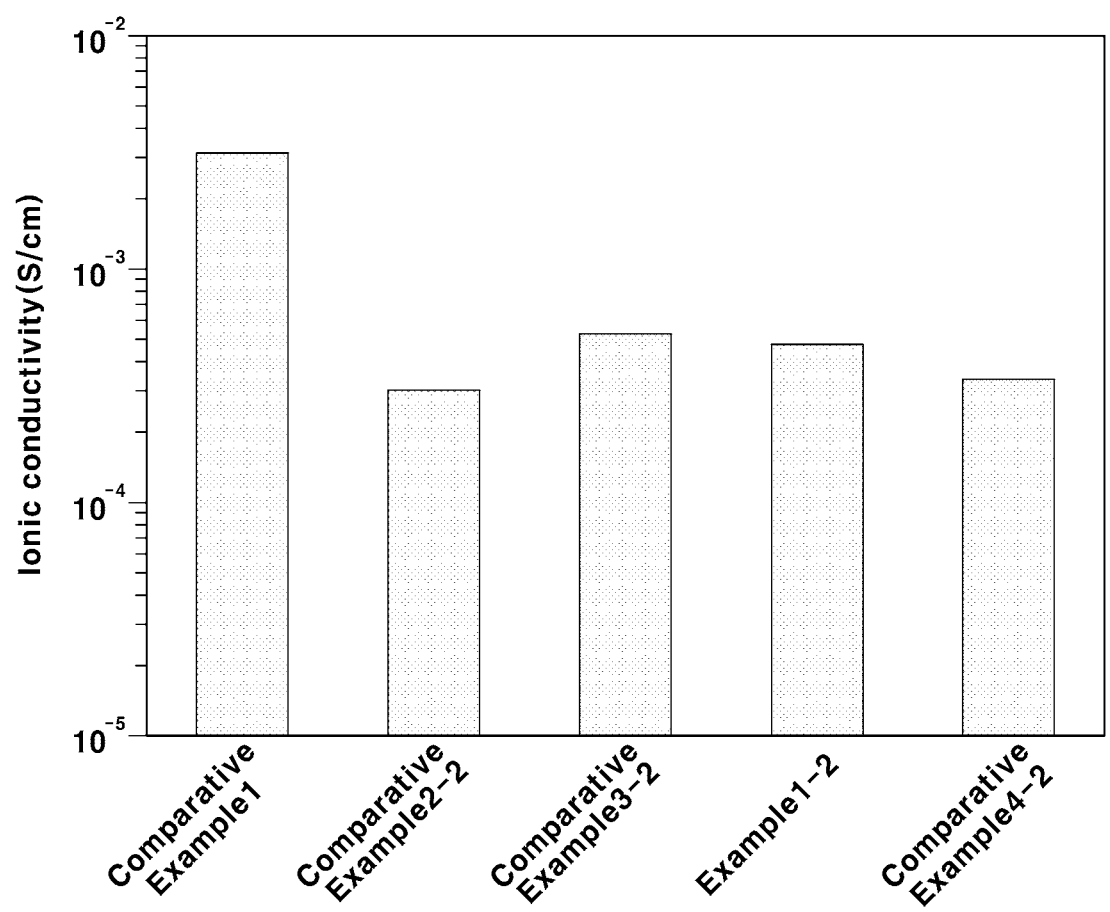
FIG. 4 is a graph showing the ionic conductivity of the lithium-air batteries manufactured in Comparative Examples 1, 2-2, 3-2 and 4-2 and Example 1-2 according to the present disclosure.
Figure 5A:
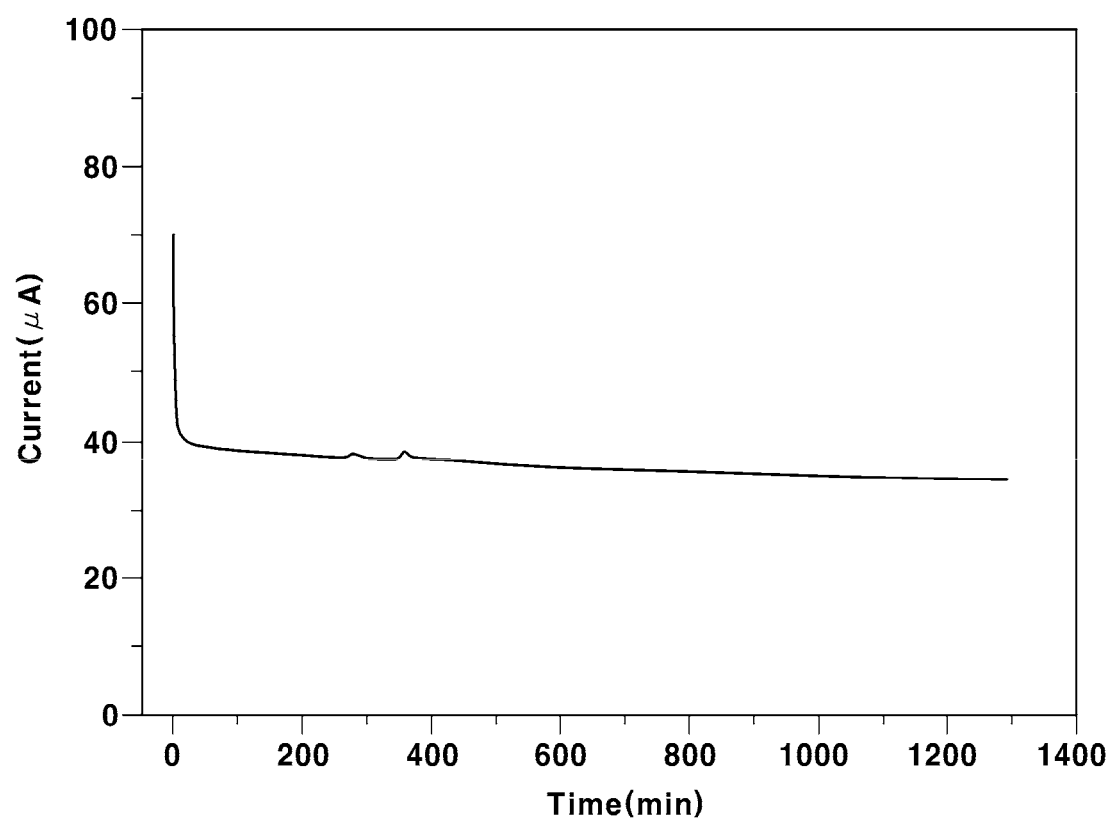
FIG. 5A is a DC current curve graph of the lithium-air battery manufactured in Example 1-2 according to the present disclosure.
Figure 5B:
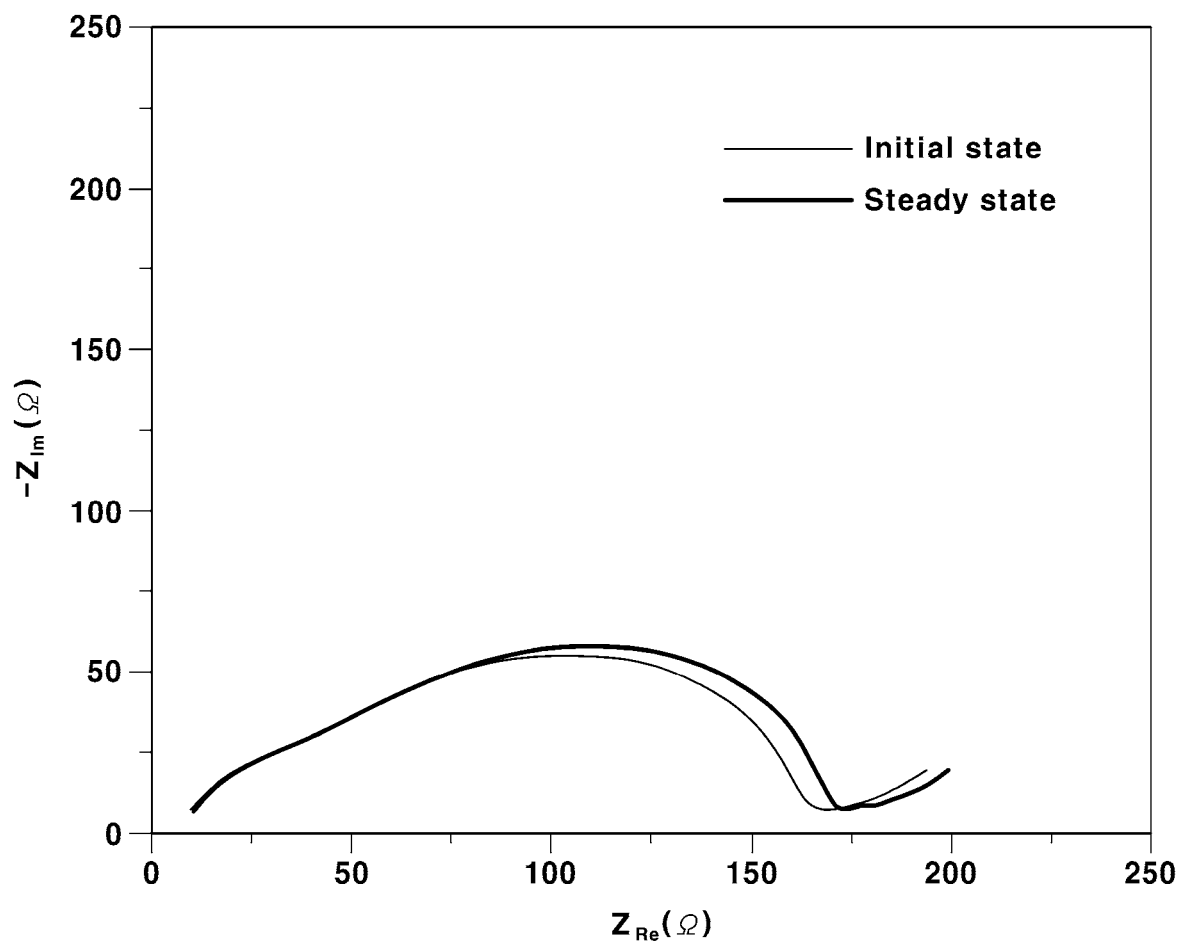
FIG. 5B is an AC impedance spectrum graph thereof.
Figure 9:
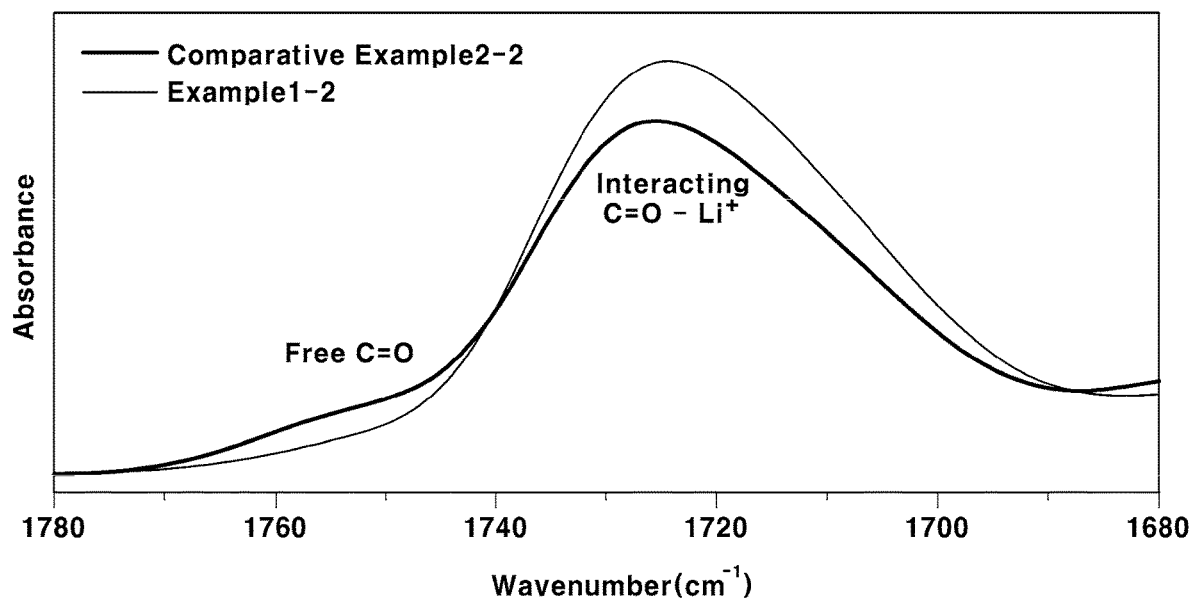
FIG. 9 is an FT-IR spectrum graph (1680 to 1780 cm$^{-1}$) of the gel polymer electrolytes of Comparative Example 2-1 and Example 1-1 according to the present disclosure.
Figure 10A:
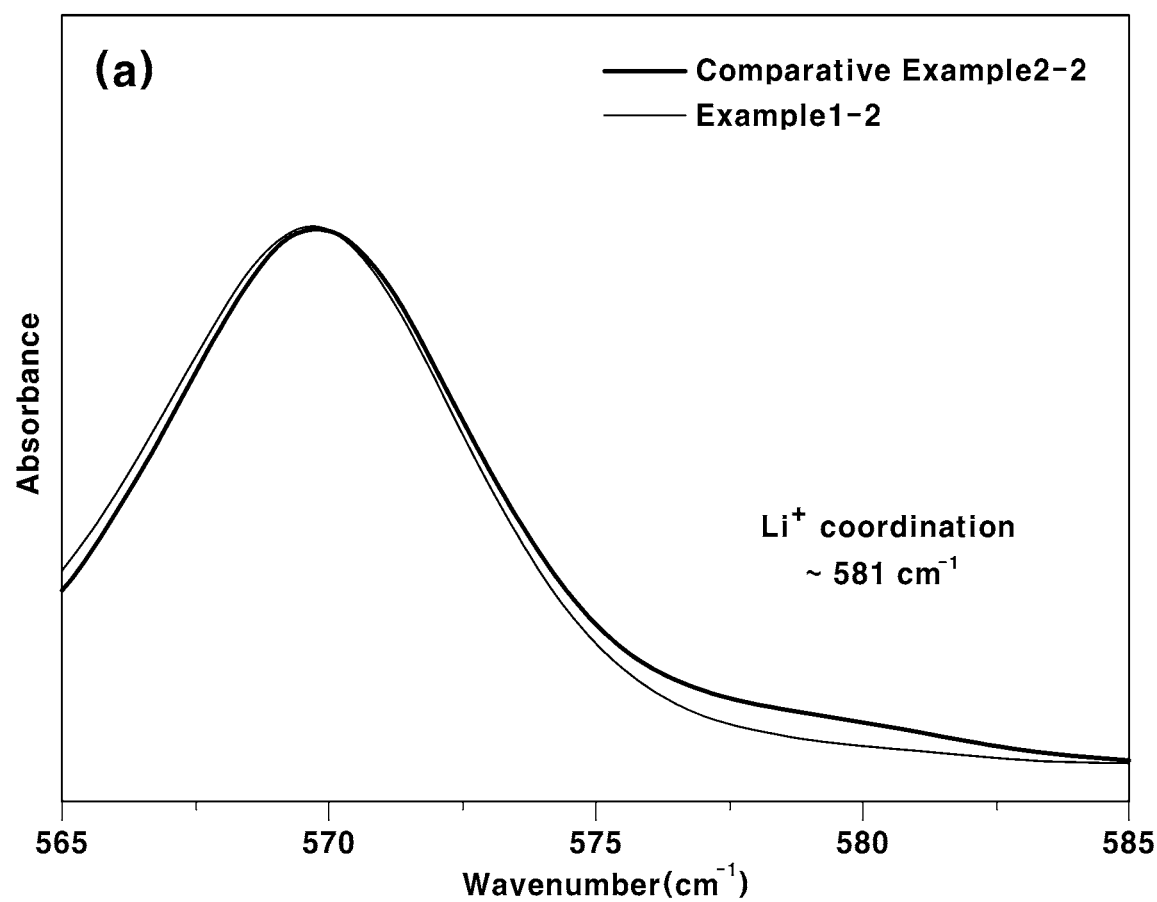
FIG. 10A is an FT-IR spectrum graph (565 to 585 cm$^{-1}$) of the gel polymer electrolytes of Comparative Example 2-2 and Example 1-2 according to the present disclosure.
Figure 10B:
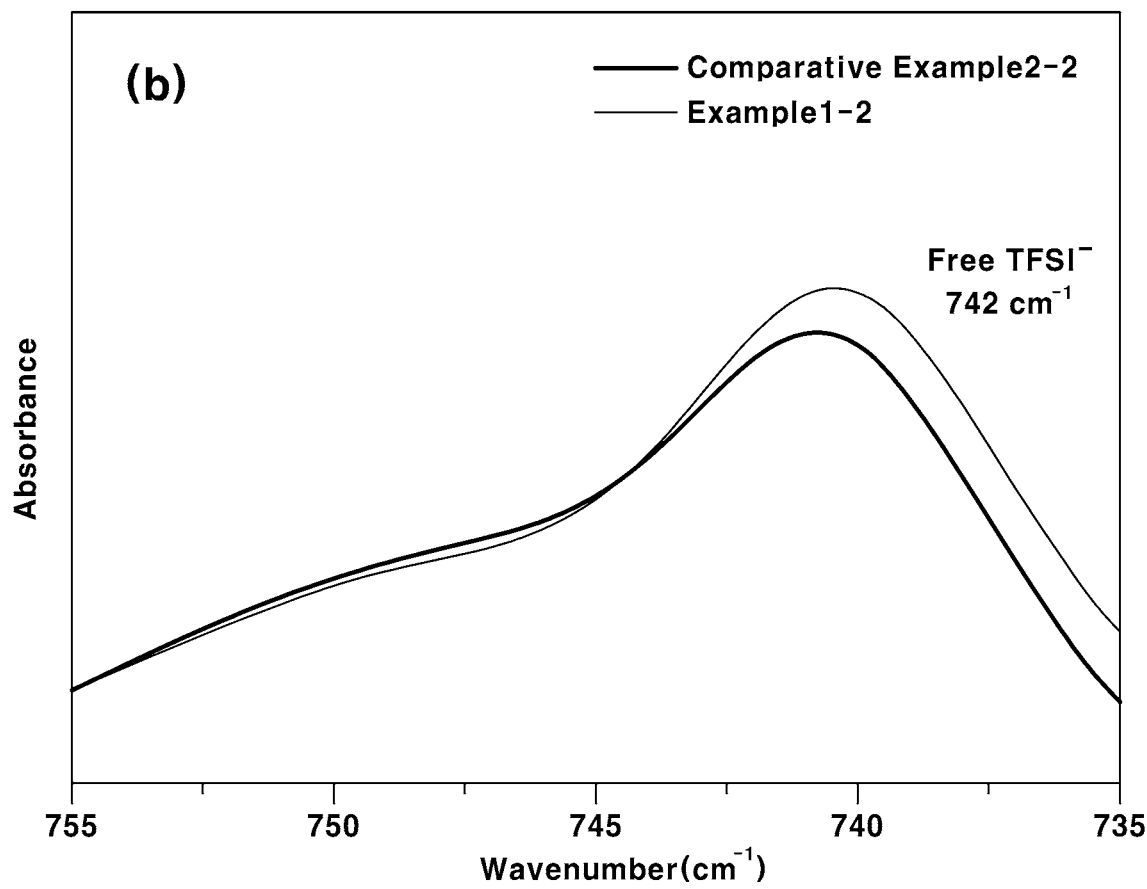
FIG. 10B is an FT-IR spectrum graph (735 to 755 cm$^{-1}$) of the gel polymer electrolytes of Comparative Example 2-2 and Example 1-2 according to the present disclosure.

With reference to Table 1 and FIGS. 4, 5A and 5B, the lithium-air battery (Example 1-2) including the gel polymer electrolyte containing the zwitterion salt exhibited further improved ionic conductivity and lithium-ion transference number. With reference to FIGS. 9, 10A and 10B, the improved ionic conductivity can be confirmed as follows: in the FT-IR spectrum, when the zwitterion salt was added, the amount of lithium ions dissociated by the polymer C=O functional group was increased, and dissociation of the lithium salt LiTFSI was promoted, thus increasing the amounts of free Li$^+$ ions and TFSI$^-$ ions.

Test Example 3: Evaluation of Electrochemical Stability of Gel Polymer Electrolyte and Ionic Liquid Electrolyte In order to compare the electrochemical stability of the gel polymer electrolyte manufactured in Example 1-1 with that of the existing ionic liquid electrolyte contained in Comparative Example 2, the current values were measured depending on the applied voltage through linear sweep voltammetry (LSV) (at a sweep rate of 1 mV/s). The results thereof are shown in FIGS. 6A and 6B.

Figure 6A:
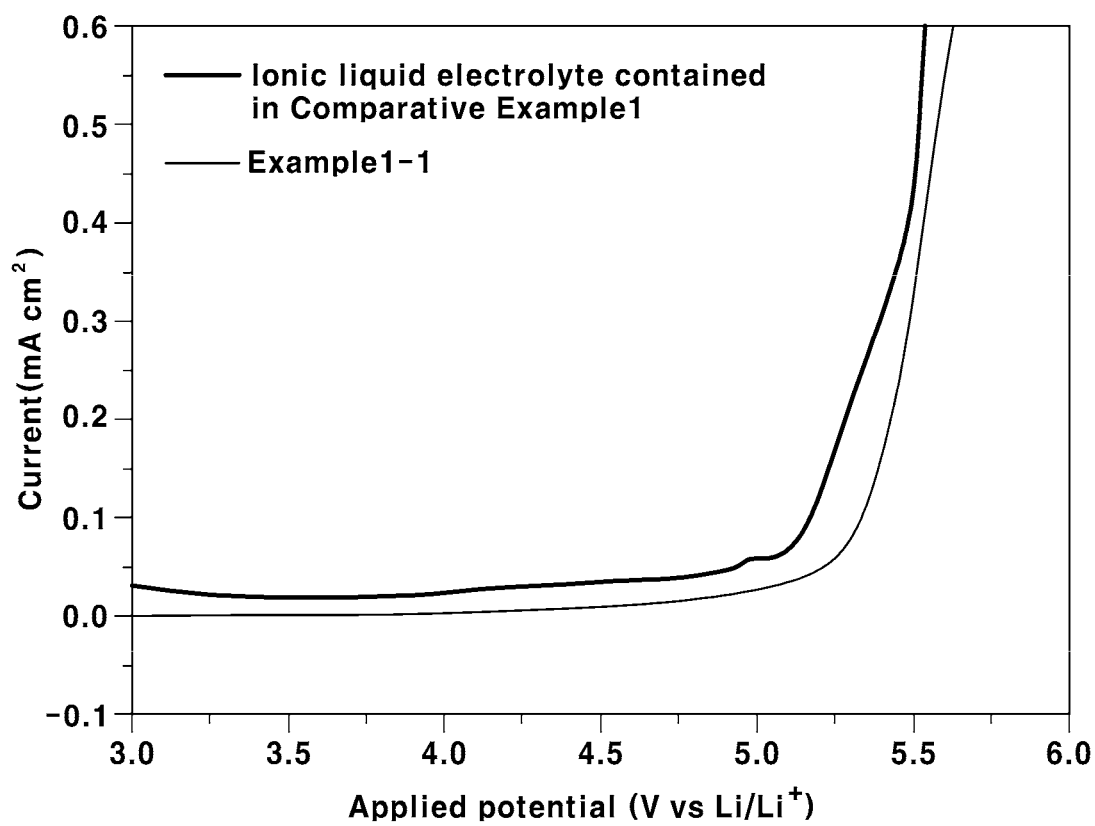
Figure 6B:
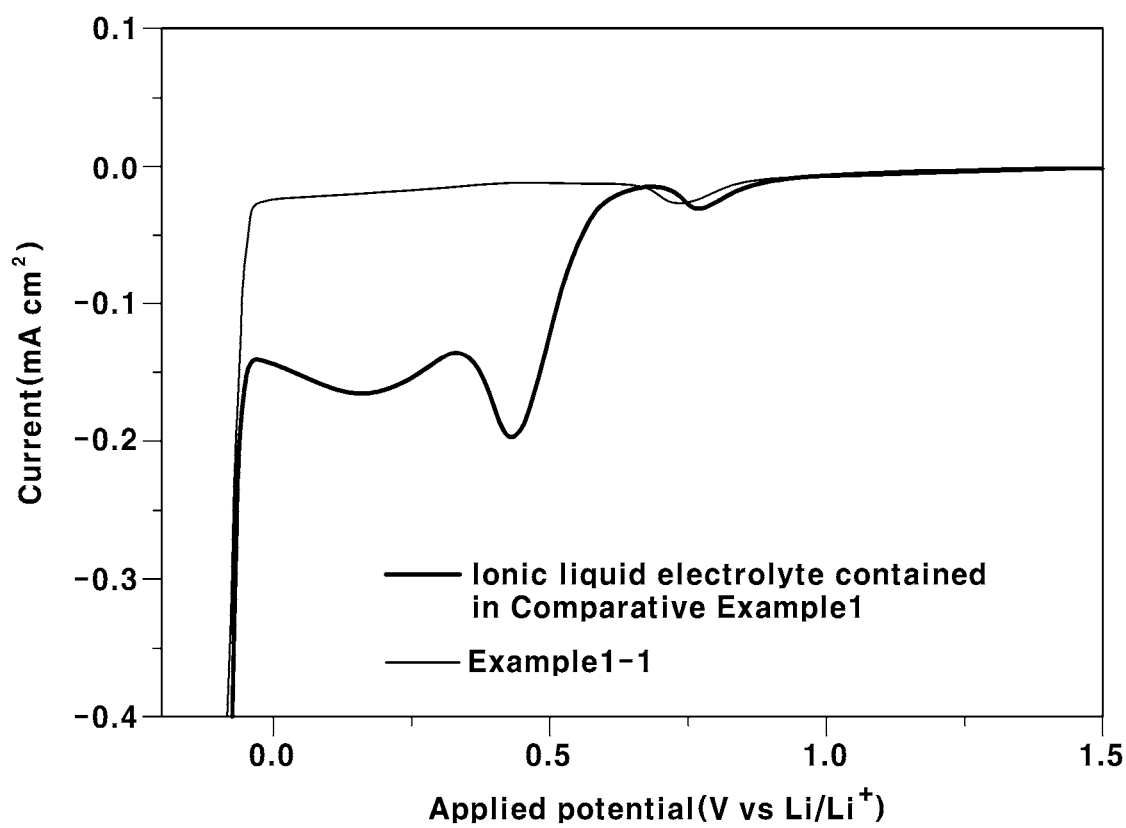

FIGS. 6A and 6B are linear sweep voltammetry curve graphs of the gel polymer electrolyte manufactured in Example 1-1 and the ionic liquid electrolyte contained in Comparative Example 2. In FIGS. 6A and 6B, the liquid electrolyte contained in Comparative Example 2 exhibited reduction stability of 0.5 V and oxidation stability of 5 V, whereas the gel polymer electrolyte manufactured in Example 1-1 exhibited reduction stability of 0 V and oxidation stability of 5.2 V or more. This is because the ionic liquid electrolyte is trapped in the polymer matrix and thus the number of molecules able to react with lithium metal decreases. Thereby, it can be confirmed that the organic-inorganic hybrid gel polymer electrolyte was usable in lieu of the existing liquid electrolyte and was easy to apply to a lithium-air battery requiring predetermined levels of reduction and oxidation stability.

Test Example 4: Evaluation of Interface of Lithium Metal and Electrolyte

In order to measure the interfacial resistance of the electrode and electrolyte over time, the AC impedance spectrum of the lithium-air battery of each of Comparative Example 2, Comparative Example 3-2 and Example 1-2 was obtained. The results thereof are shown in FIGS. 7A to 7C.

Figure 7A:
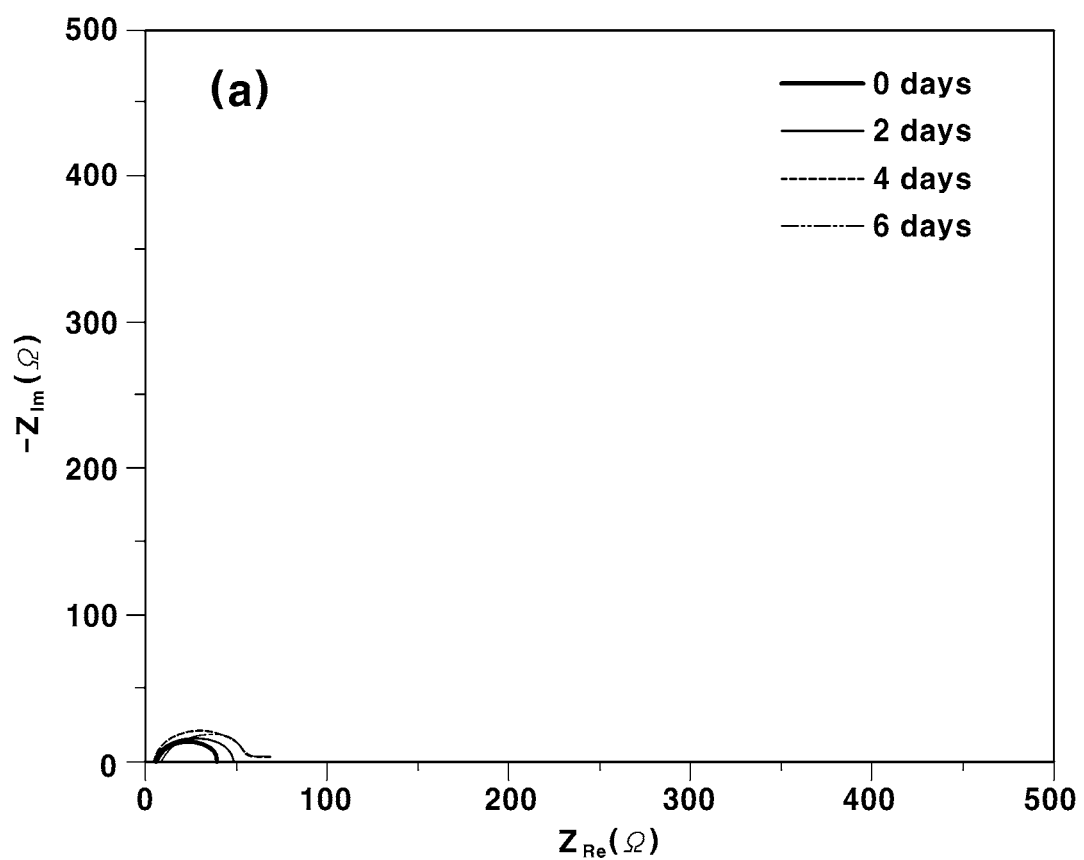
FIG. 7A is an AC impedance spectrum graph of the lithium-air battery manufactured in Comparative Example 1 according to the present disclosure.
Figure 7B:
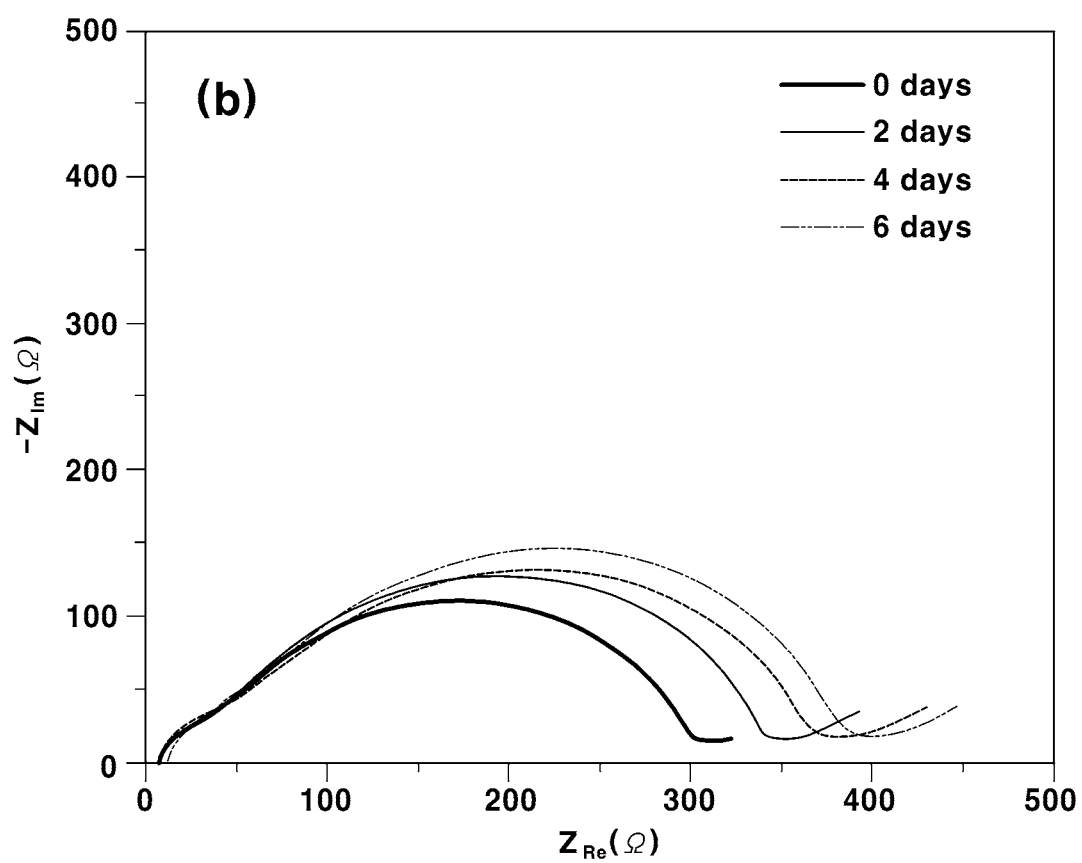
FIG. 7B is an AC impedance spectrum graph of the lithium-air battery manufactured in Comparative Example 2-2 according to the present disclosure.
Figure 7C:
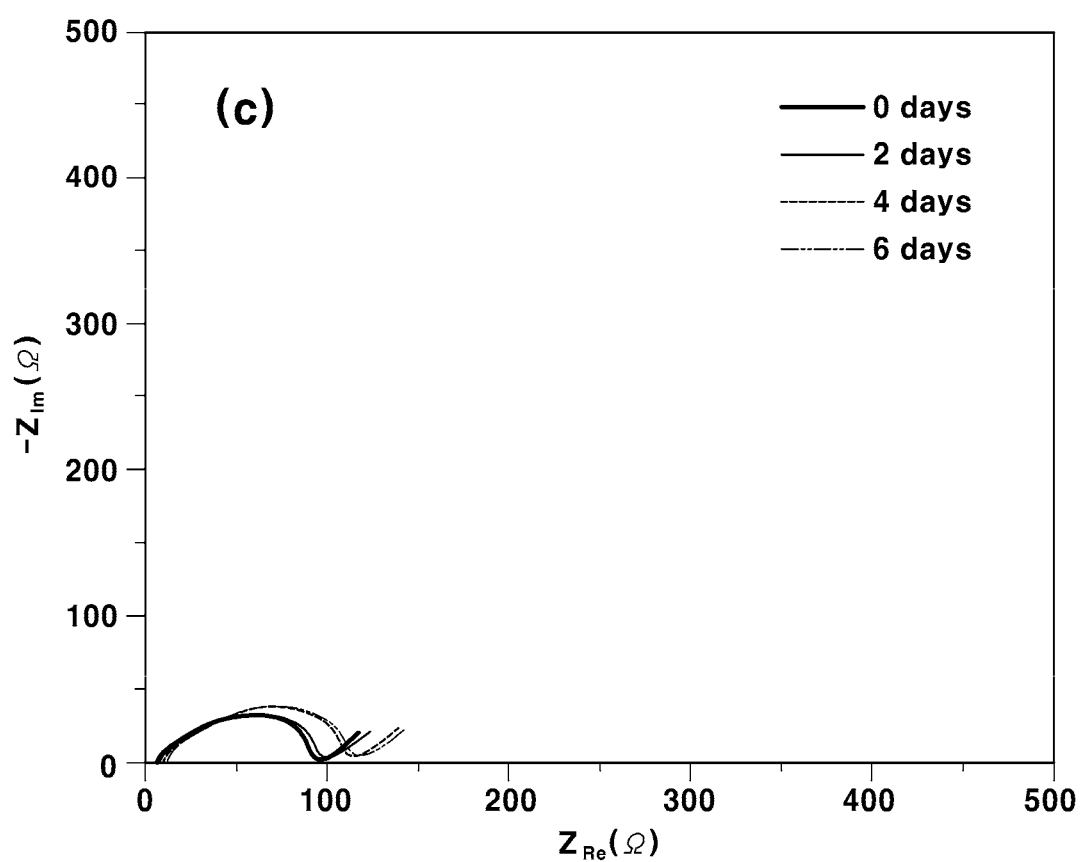
FIG. 7C is an AC impedance spectrum graph of the lithium-air battery manufactured in Example 1-2 according to the present disclosure.

With reference to FIGS. 7A to 7C, in the battery manufactured using the gel polymer electrolyte containing the zwitterion salt, the initial interfacial resistance was great but the extent of increase in the interfacial resistance over time was small compared to the battery using the ionic liquid electrolyte. This result is because side reactions of the lithium electrode with the ionic liquid and the lithium salt are suppressed by the gel polymer electrolyte in contact with the lithium electrode. It can be confirmed that the gel polymer electrolyte effectively contributed to the interfacial stabilization between the lithium electrode and the electrolyte.

Test Example 5: DC Polarization of Lithium Symmetric Cell

Figure 8:
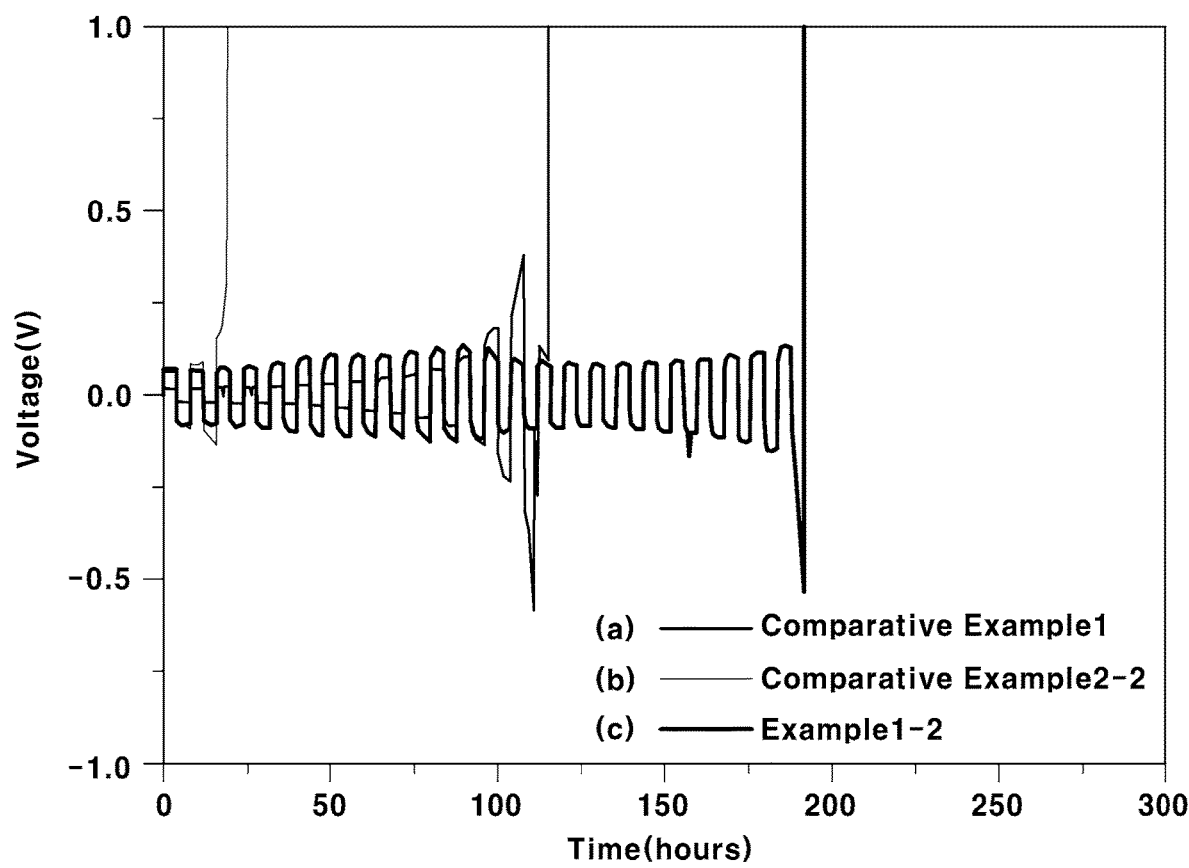
FIG. 8 is a graph showing the DC polarization curves of the lithium-air batteries manufactured in Comparative Example 1, Comparative Example 2-2 and Example 1-2 according to the present disclosure.

When a predetermined amount of current was repetitively applied to the lithium-air battery of each of Comparative Example 2, Comparative Example 3-2 and Example 1-2, changes in voltage of the cell were measured and thus the cell polarization was evaluated. The results thereof are shown in FIG. 8. The current density was 0.25 mA/cm$^2$ and the total charge was 1.0 mAh/cm$^2$. Initially, the overvoltage of the battery including the gel polymer electrolyte containing no zwitterion salt was rapidly increased at the beginning of the cycle. This is because lithium ions reach a mass transfer limit due to high electrode-electrolyte interfacial resistance and low ionic conductivity. In contrast, the battery containing the ionic liquid electrolyte initially exhibited the lowest overvoltage, but side reactions with the lithium electrode occurred continuously due to the poor reduction stability, and thus the overvoltage drastically increased with changes in the cell voltage. Meanwhile, in the battery including the gel polymer electrolyte containing the zwitterion salt, initial overvoltage was large compared to the battery containing the ionic liquid electrolyte, but the overvoltage did not increase significantly for a long time, and stable charge-discharge behavior resulted. Therefore, it was confirmed that stable interfacial resistance was maintained at the lithium electrode, that oxidation and reduction reactions of lithium occurred, and that the growth of lithium dendrites was suppressed.

Test Example 6: Evaluation of Charging and Discharging of Lithium-Air Battery In order to evaluate the charge-discharge characteristics of the lithium-air battery of each of Example 1-2 and Comparative Examples 1, 2-2, 3-2, and 4-2, constant current of 0.25 mA/cm was applied in an oxygen atmosphere, and the charge-discharge voltage per cycle was measured. The results thereof are shown in FIGS. 11, 12, 13, 14A and 14B.

Figure 11:
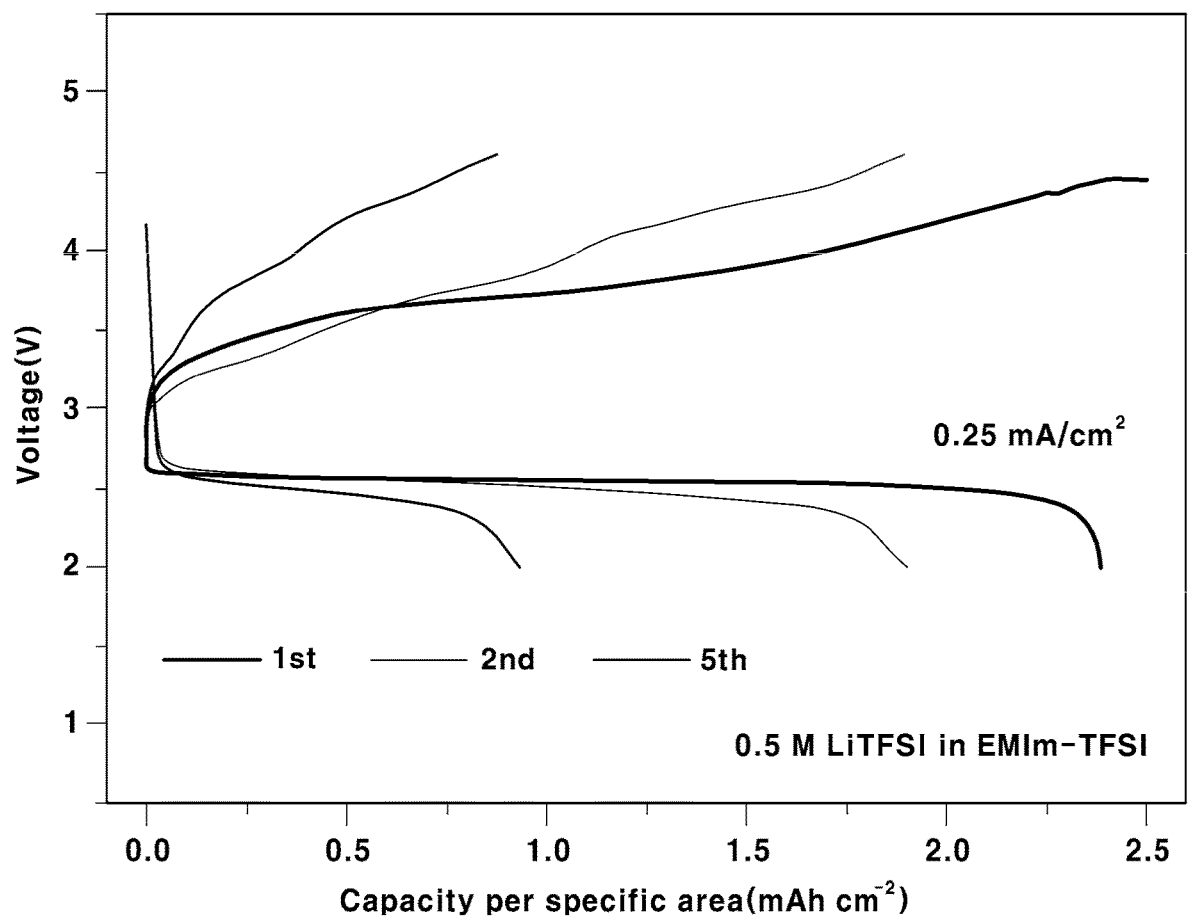
FIG. 11 is a graph showing the charge-discharge curve per cycle of the lithium-air battery manufactured in Comparative Example 1 according to the present disclosure.

With reference to FIG. 11, in the charge-discharge curve of the lithium-air battery of Comparative Example 1, as the cycle progressed, overvoltage gradually increased, and thus the battery capacity was not efficiently manifested.

Figure 12:
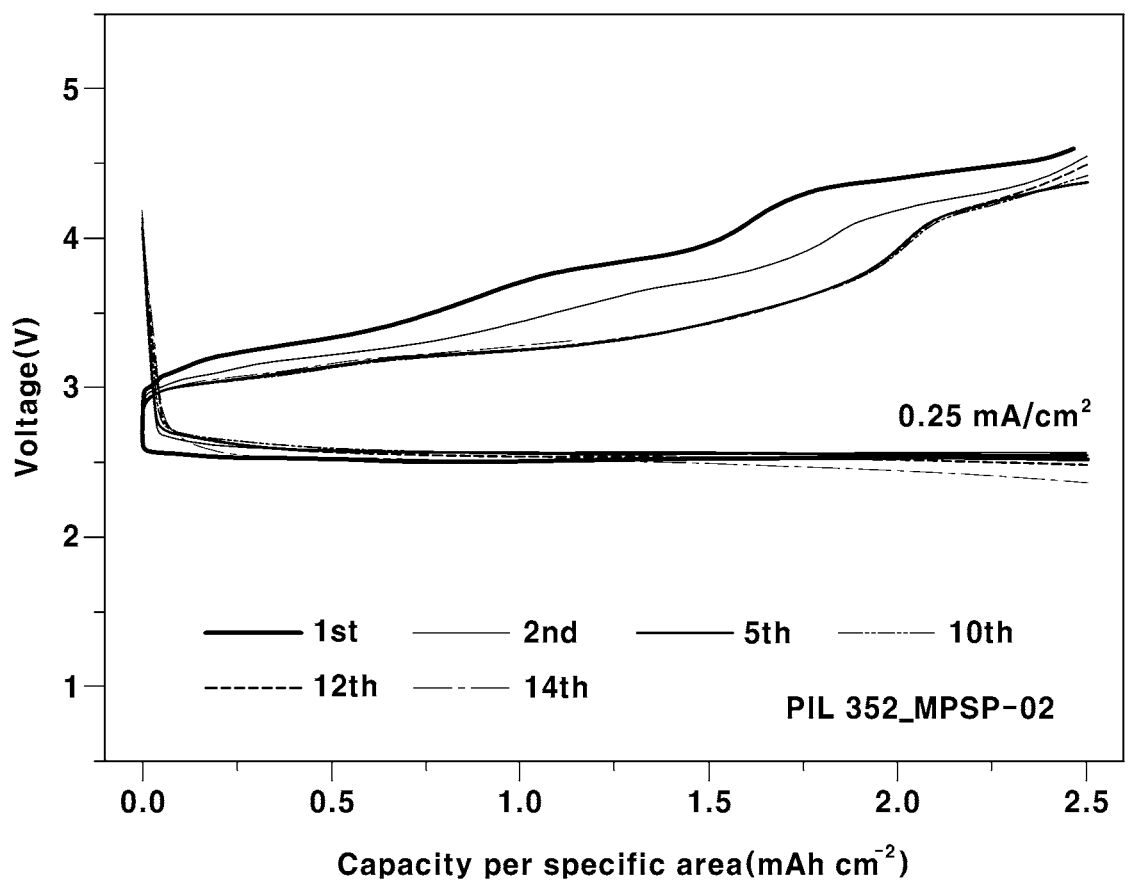
FIG. 12 is a graph showing the charge-discharge curve per cycle of the lithium-air battery manufactured in Example 1-2 according to the present disclosure.

With reference to FIG. 12, in the charge-discharge curve of the lithium-air battery including the gel polymer electrolyte containing the zwitterion salt (Example 1-2), the overvoltage was low and the lifetime was improved by about 15 cycles based on the cut-off capacity of 2.5 mAh/cm$^2$ compared to the lithium-air battery using the ionic liquid electrolyte.

Figure 13:
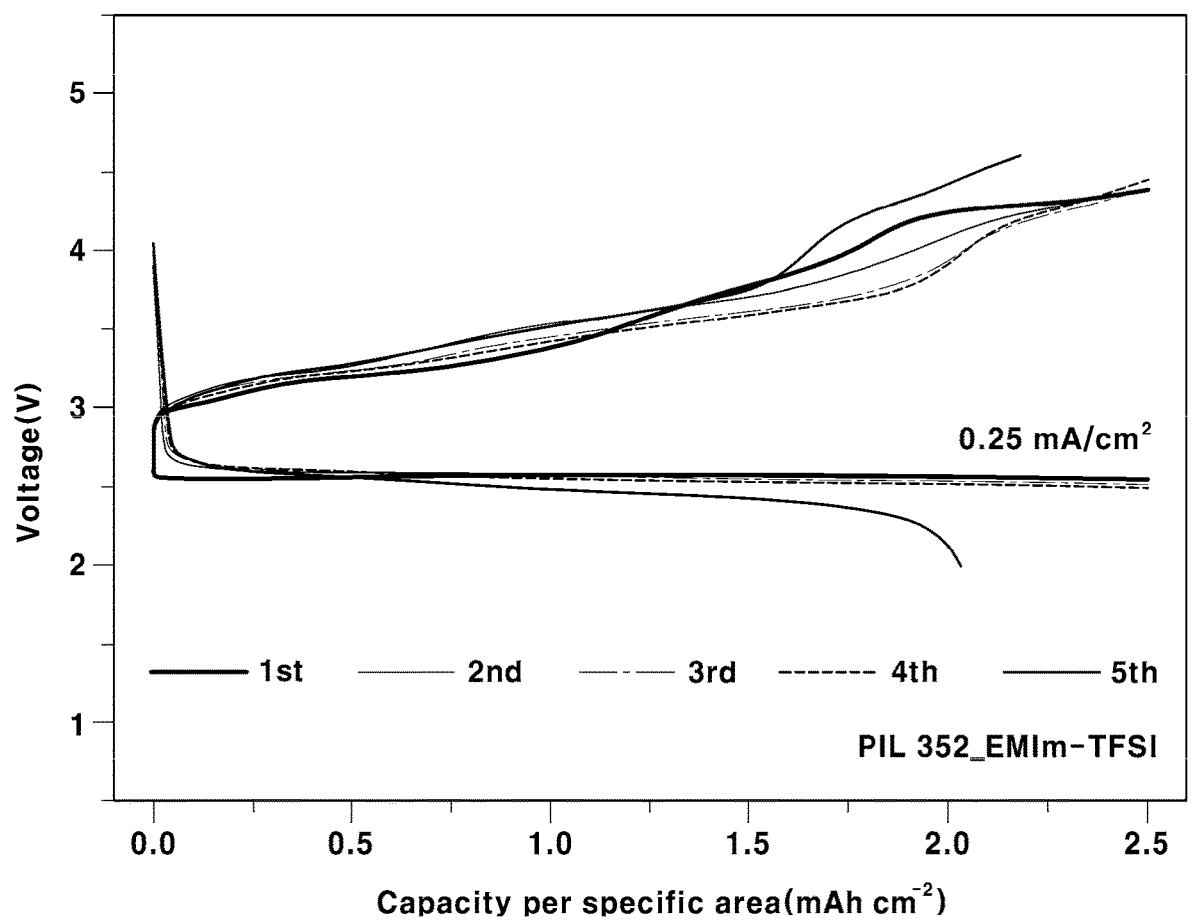
FIG. 13 is a graph showing the charge-discharge curve per cycle of the lithium-air battery manufactured in Comparative Example 2-2 according to the present disclosure.

With reference to FIG. 13, in the charge-discharge curve of the lithium-air battery including the gel polymer electrolyte containing no zwitterion salt (Comparative Example 2-2), the overvoltage gradually increased starting with the 5$^{th}$ cycle.

Figure 14A:
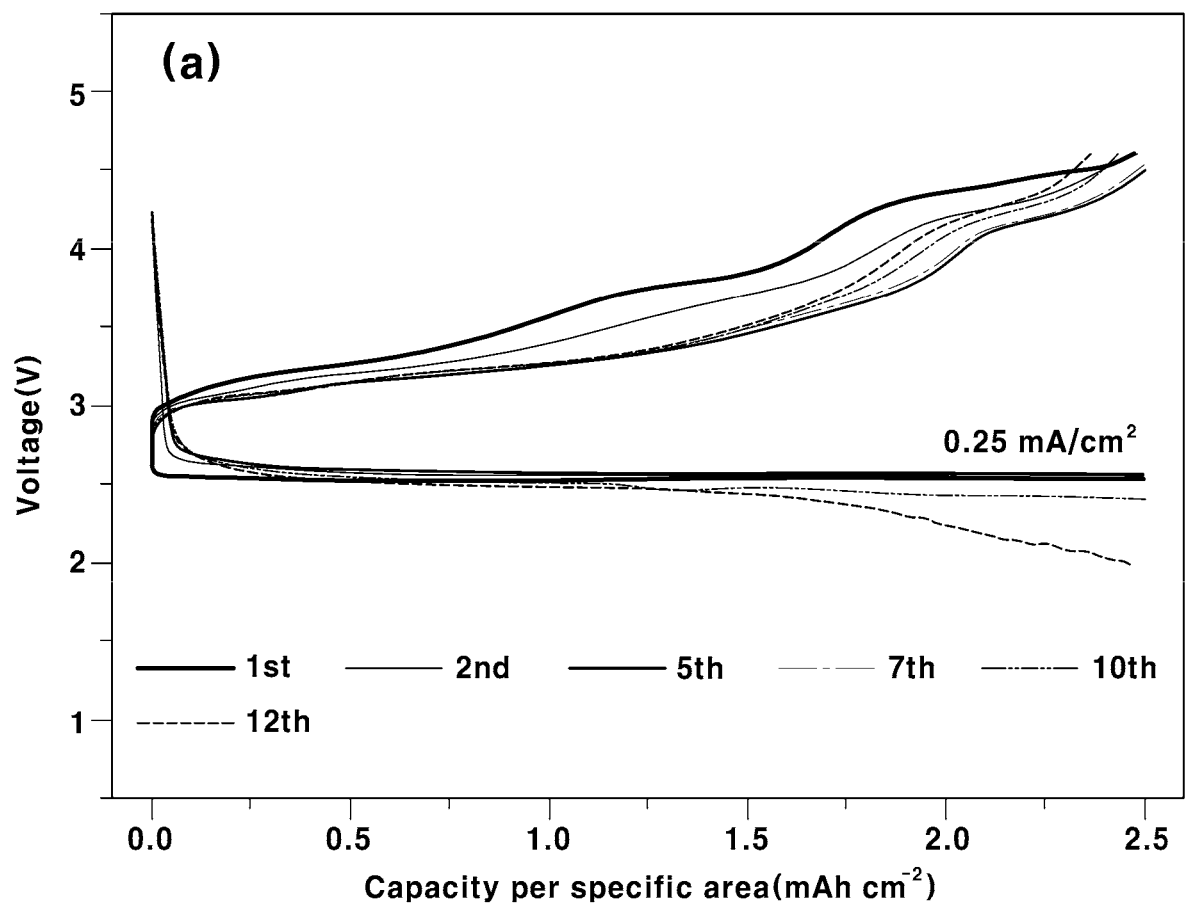
FIG. 14A is a graph showing the charge-discharge curve per cycle of the lithium-air battery manufactured in Comparative Example 3-2 according to the present disclosure.
Figure 14B:
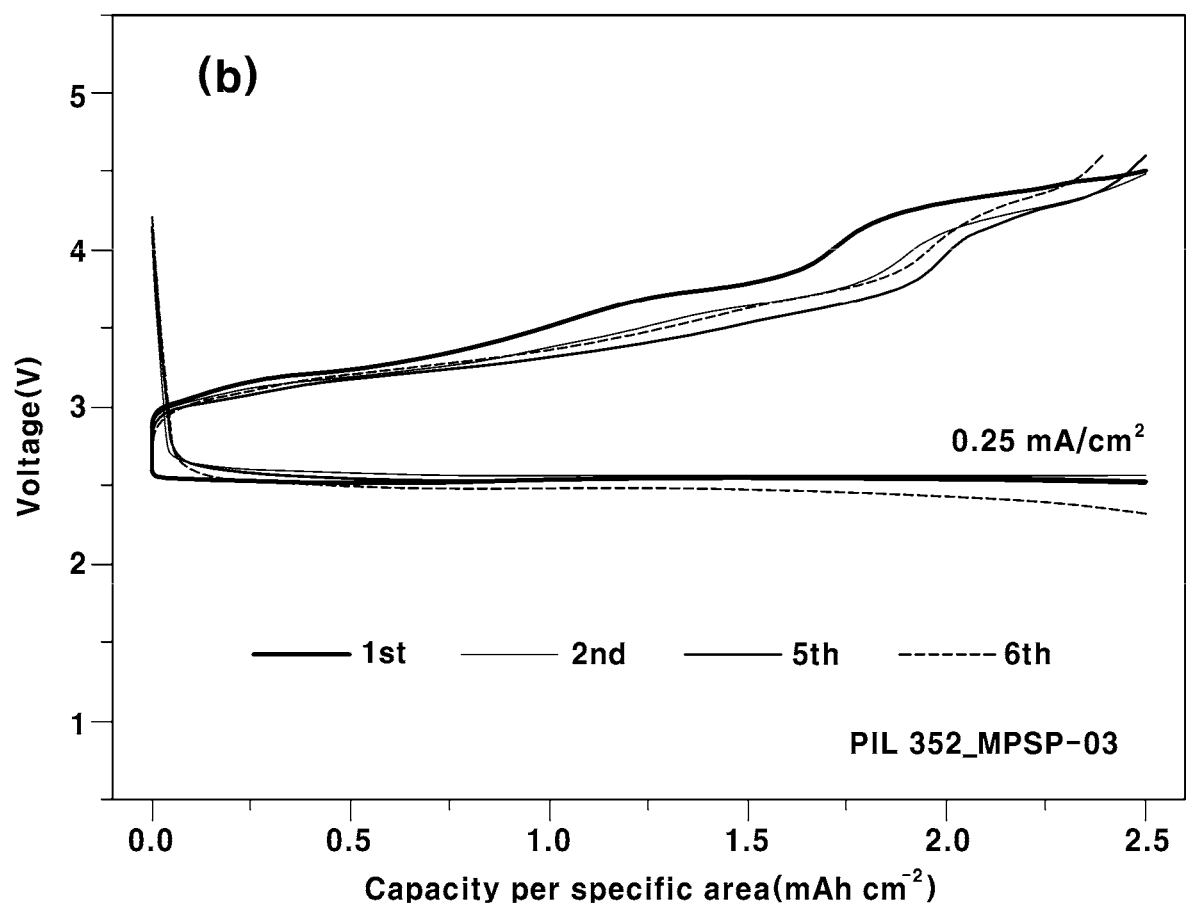
FIG. 14B is a graph showing the charge-discharge curve per cycle of the lithium-air battery manufactured in Comparative Example 4-2 according to the present disclosure.

With reference to FIGS. 14A and 14B, in the charge-discharge curves of the lithium-air batteries including the gel polymer electrolyte using the zwitterion salt in various amounts (Comparative Example 3-2 and 4-2), the lifetime thereof was decreased compared to the lithium-air battery including the gel polymer electrolyte containing the zwitterion salt (Example 1-2). Specifically, in the lithium-air battery of Comparative Example 3-2, using the zwitterion salt in a smaller amount than in Example 1-2, the ionic conductivity was high but the amount of the zwitterion salt was low, and thus sufficiently improved interfacial properties were not exhibited. In contrast, in the lithium-air battery of Comparative Example 4-2, using the zwitterion salt in a larger amount than in Example 1-2, the lowered ionic conductivity resulting from the increase in the viscosity in the electrolyte due to the increase in the number of molecules in the additive did not increase the battery lifetime. Therefore, it was concluded that the lithium-air battery (Example 1-2) including the gel polymer electrolyte containing the zwitterion salt in an appropriate amount exhibited the most optimal performance.

Although the preferred embodiments of the present disclosure have been disclosed for illustrative purposes, those skilled in the art will appreciate that various modifications, additions and substitutions are possible without departing from the scope and spirit of the disclosure as disclosed in the accompanying claims.

What is claimed is:

1. A gel polymer electrolyte for a lithium-air battery, comprising:
   a composite polymer resin comprising a linear polymer and a crosslinking agent;
   an ionic liquid;
   a lithium salt;
   a zwitterion salt;
   an initiator; and
   an organic solvent.

2. The gel polymer electrolyte of claim 1, comprising:
   4 to 6 wt % of the composite polymer resin;
   7 to 10 wt % of the ionic liquid;
   2 to 5 wt % of the lithium salt;
   0.15 to 0.40 wt % of the zwitterion salt;
   0.02 to 0.04 wt % of the initiator; and
   80 to 85 wt % of the organic solvent.

3. The gel polymer electrolyte of claim 1, wherein the composite polymer resin comprises 85 to 95 wt % of the linear polymer and 5 to 15 wt % of the crosslinking agent.

4. The gel polymer electrolyte of claim 1, wherein the linear polymer is at least one copolymer or mixture selected from the group consisting of polymethyl methacrylate, polystyrene, polyethylene oxide, polytetrafluoroethylene, Nafion and polyurethane.

5. The gel polymer electrolyte of claim 1, wherein the crosslinking agent comprises at least one selected from the group consisting of divinylbenzene (DVB), triethylene glycol diacrylate (TEGDA) and polyethylene glycol diacrylate (PEGDA).

6. The gel polymer electrolyte of claim 1, wherein the ionic liquid comprises a salt comprising:
   at least one cation selected from the group consisting of imidazolium, pyrrolidinium, piperidinium, ammonium, phosphonium, sulfonium, pyridinium, pyrazolium, triazolium, thiazolium, oxazolium, pyridazinium, pyrimidinium and pyrazinium; and
   at least one anion selected from the group consisting of acetate, bis(fluorosulfonyl)imide, bis(fluoromethanesulfonyl)imide, bromide, chloride, iodide, dicyanamide, hexafluorophosphate, tetrafluoroborate and hydrogen sulfate.

7. The gel polymer electrolyte of claim 1, wherein the lithium salt comprises at least one selected from the group consisting of LiTFSI, LiFSI, LiBF$_4$, LiPF$_6$, LiClO$_4$, LiAsF$_6$, LiDFOB and LiBOB.

8. The gel polymer electrolyte of claim 1, wherein the zwitterion salt comprises at least one cation selected from the group consisting of imidazolium, pyrrolidinium, piperidinium and ammonium and at least one anion selected from the group consisting of sulfonate, carboxylate and phosphite.

9. The gel polymer electrolyte of claim 1, wherein the initiator comprises at least one selected from the group consisting of 2,2'-azobis(2-methylpropionitrile) (AIBN), benzoyl peroxide and lauroyl peroxide.

10. The gel polymer electrolyte of claim 1, wherein the organic solvent comprises at least one selected from the group consisting of tetrahydrofuran (TIF), acetonitrile (ACN) and dimethyl carbonate (DMC).

11. A lithium-air battery, comprising:
    an anode comprising lithium;
    a cathode using oxygen as a cathode active material;
    the gel polymer electrolyte of claim 1 disposed between the anode and the cathode; and
    a separation membrane positioned on the gel polymer electrolyte.

12. The lithium-air battery of claim 11, wherein the separation membrane comprises at least one selected from the group consisting of olefin resin, glass fiber, fluorine resin, ester resin and cellulose nonwoven fabric.

* * * * *